3,205,158
CONDITION RESPONSIVE DEVICES
James J. Renier, Hopkins, Minn., assignor to Honeywell Inc., a corporation of Delaware
Filed Oct. 4, 1962, Ser. No. 228,442
4 Claims. (Cl. 204—195)

The present invention is directed to an improved device for use in indicating a time-temperature history of an article. More particularly, it is directed to an improved indicator for use in a device in accordance with the co-pending application of Bernt Tessem, Serial No. 754,573, filed August 12, 1958, now Patent 3,046,786, and in the device of the co-pending application of James J. Renier, Serial No. 137,322, filed September 11, 1961, now Patent 3,082,624, and in the device of a co-pending application of William Morin, Serial No. 167,734, filed January 22, 1962. All of the above identified co-pending applications are assigned to the same assignee as the present invention.

Figure 1:
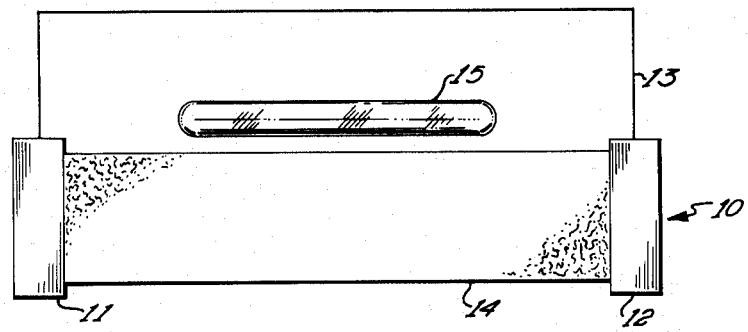

The operation of the device of the co-pending Tessem application may be best understood with regard to FIGURE 1 which shows in schematic form a device in accordance with the Tessem application. The device generally indicated 10 has as its component parts a porous matrix 14 of paper, fiber, porous ceramic, or the like. At the extremities of the matrix and in contact therewith are located two dissimilar metal bodies 11 and 12, which for example could be copper and cadmium. The two dissimilar metal bodies 11 and 12 are externally connected in an electrical circuit by a wire 13. A frangible vial of glass or the like 15 is in close proximity to the porous matrix 14. The entire device is enclosed in a water-tight plastic case, not shown. The vial 15 contains an aqueous solution of an electrolyte such as 5% potassium chloride and an indicator substance sensitive to pH such as phenolphthalein.

In order to activate the Tessem device, the vial 15 is fractured so as to allow the electrolyte solution to impregnate the porous matrix 14. This completes the electrical circuit and establishes a galvanic cell. At the less noble of the two metals 11 and 12, hydroxyl ions are generated as by-products of the cell operation. These ions migrate from the electrode across the matrix at a rate dependent on time and temperature of the environment. At temperatures above the freezing point of the electrolyte, the reaction at the electrodes and the migration of the electrolyte is relatively rapid. At temperatures below freezing, the solid state, a reaction occurs which is finite although considerably reduced. Detection of the extent of migration of the hydroxyl ions is determined by the color change of the indicator substance phenolphthalein. The extent of migration is thus a time-temperature integrated determination of the past temperature history of the device.

Figure 2:
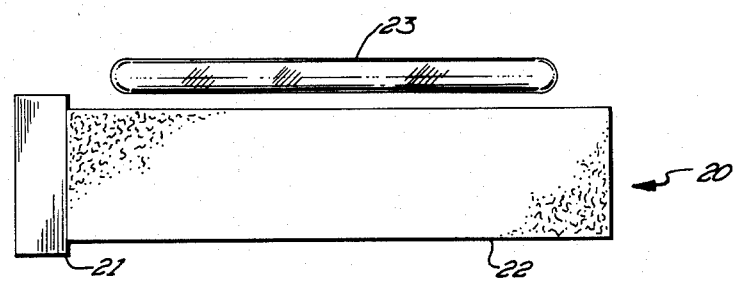

The co-pending Renier application referred to above is similar in some respects to the above discussed Tessem application. In the co-pending Renier application, a porous matrix as shown in FIGURE 2 and identified 22 is in direct contact with a metallic member 21 which may be, for example, magnesium. In close relation to the porous matrix is a frangible vial 23 containing an electrolyte liquid which may be the same as discussed in regard to the co-pending Tessem application. Following fracture of the frangible vial, the electrolyte wets the porous matrix 22 and initiates operation of the device. A reaction occurs at the metal electrolyte interface as indicated below:

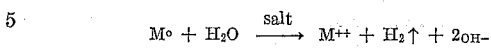
$$M^\circ + H_2O \xrightarrow{\text{salt}} M^{++} + H_2\uparrow + 2_{OH^-}$$

As can be seen from the above equation, hydroxyl ions are generated in this device also. The hydroxyl ions are generated and migrate at a rate which is dependent upon temperature of the system. The detection of the hydroxyl ions by an indicator substance such as phenolphthalein provides a means of determining the past time-temperature history of an environment in which the indicator device has been.

Figure 3:
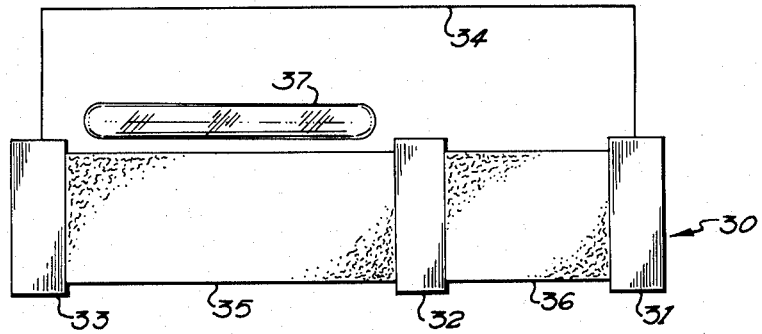

The device of the co-pending Morin application identified above may be best understood in respect to FIGURE 3. In this figure, 30 generally designates a device in accordance with the co-pending Morin application. Two dissimilar metal members 31 and 32 are arranged in conjunction with a porous matrix 36 to form a galvanic cell unit. A second porous member 35 extends from the opposite side of metal member 32 to a third metal member 33. Metal members 32 and 33 may be of the same type of metal. An external lead 34 connects metal member 31 and 33. A frangible glass vial 37 containing an electrolyte solution, which may be the same as that described with reference to FIGURES 1 and 2, is placed adjacent porous member 35. In one mode of operation porous member 36 is impregnated with an electrolyte of 5% potassium chloride solution. Upon fracture of vial 37, porous member 35 is impregnated and thus completes the entire circuit. In effect, the device then consists of a galvanic cell comprising members 32, 36 and 31 with the electrical output of said cell passing through an electrolytic cell composed of members 33, 35 and 32. The passage of the output current of the galvanic cell through the electrolytic cell results in the generation of hydrozyl ions at electrode 33, the rate of generation of the hydroxyl ion being dependent upon the temperature of the system and the rate of migration of the hydroxyl ion also being dependent upon the temperature of the system. The use of the phenolphthalein provides a means of detecting the extent of the migration of the hydroxyl ion and consequently provides a time-temperature integrated indication of the past history of the device.

As can be seen from the foregoing discussion of the three co-pending time-temperature integrator devices, the indication of time-temperature history is made by detection of the ions generated in the various reactions. Use is made of the change in hydroxyl ion concentration of a portion of the porous matrix material in one form of each of these devices. The common thread between these applications is the generation of hydroxyl ion and the detection of this hydroxyl ion through the use of the usual pH indicator such as phenolphthalein. While the use of indicators of this type has proved to be a workable solution to the need for detection of the extent of migration of the hydroxyl ion, it does possess one disadvantage. This disadvantage is that if the rate of generation of the hydroxyl ion diminishes to substantially zero a potential regression of the front edge of the movement of the hydroxyl ion may occur. In operation the devices appear to have a steady movement of a colored change in the porous matrix in much the same manner as movement of a column in a thermometer or the like. When the movement has ceased due to the failure to generate further hydroxyl ions, the remaining solution of unconverted material will on occasion react with the hydroxyl ion and dilute it to such an extent that the front edge of the movement is in effect returned to some previous position. This provides an error in the actual extent of exposure to certain time and temperatures.

A further disadvantage which is present in the use of common reversible pH indicators is that they tend to be somewhat unstable insofar as their color is concerned to the very high concentration hydroxyl ions. This is particularly true on long exposure to the high concentration of hydroxyl ions. Of course, a fading of the color due to this phenomena would result in an unreadable device or a device which would indicate falsely the true extent of migration of the hydroxyl ion.

The present invention provides an indicator system for devices of the type described above which is both stable to high pHs encountered in the operation of these type of devices and possesses the added advantage of being totally irreversible under the conditions of operation of these devices. That is, once a reaction has occurred to provide an indication, the indication is not reversible through any regressive movement of the boundary.

As is known in the chemical art, certain oxidation and reduction reactions occur only at certain pH or ranges of pH. For example, the following reactions are in effect "activated" by the presence of hydroxyl ion concentrations in pHs in excess of 6:

$$Mn^{++} + 2H_2O \rightarrow MnO_2\downarrow(brown) + 4H^+ + 2e$$
$$Bi^{+++} + 3e \rightarrow Bi°\downarrow(black)$$
$$Hg^{++} + 2e \rightarrow Hg°(black)\downarrow$$

Reactions of the above type provide an indicator system for the devices of the type described above that results in both the desired visible change of color and an irreversible stable color. That is, the reaction products of these reactions are not dissolved in or effected by the excess concentration of hydroxyl ions resulting from galvanic cell operation. Neither are they dissolved in the presence of weakly acid solutions which might be present in the unreacted portion of the device.

While the above identified examples provide workable illustrations of the present invention, they are by no means exclusionary. A wide variety of equivalent reactions can be found by consulting various handbooks.

The following specific examples are given to describe the preferred mode of operation of the present invention. As has been indicated, the following examples are not considered to be exclusionary of other modes of operation using the principles of the invention but are merely illustrative.

*Example I*

A solution was prepared having the following composition:

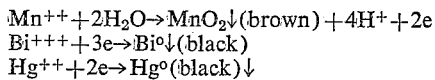

This solution was clear in color. Portions of the above solution were sealed in glass vials and placed into devices in accordance with each of the above identified co-pending applications. These devices were then activated by fracturing the vials thereby wetting the porous matrix members initiating the various reactions producing hydroxyl ions. A moving band of brown color proceeded across the porous members indicating the extent of migration of the hydroxyl ion from the generating metal-electrolyte interface.

The oxidizing agent in this example may be oxygen gas contained within the envelope of plastic or the like surrounding the active portion of the integrator. This oxygen has proven adequate to convert sufficient $Mn^{++}$ to the $Mn^{++++}$ to produce a distinct color change.

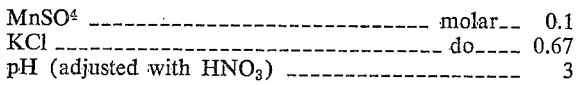

In this example, as well as in the subsequent examples, it will be apparent to those skilled in the art that many suitable oxidizing or reducing agents may be selected which will operate in accordance with the invention. The requirements are that the oxidation-reduction reaction produces a distinct color change; that the reaction occurs only upon increasing basicity of the solution, and that the generating metal-electrolyte interface.

*Example II*

A solution was prepared having the following composition:

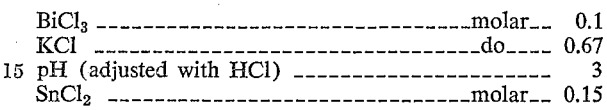

The above solution was clear in color. Portions of this solution were sealed in glass vials and the vials placed into devices in accordance with each of the above identified co-pending applications. These devices were then activated by fracturing the vials thereby wetting the porous matrix members and initiating the various previously noted reactions producing hydroxyl ions. A moving black region proceeded across the porous members indicating the extent of migration of the hydroxyl ions from the generating metal-electrolyte interface.

*Example III*

A solution was prepared having the following composition:

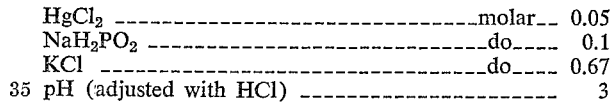

The above solution was clear in color. Portions of this solution were sealed in glass vials and the vials placed into devices in accordance with each of the above identified co-pending applications. These devices were then activated by fracturing the vials thereby wetting the porous matrix members and initiating the various previously noted reactions producing hydroxyl ions. A moving black belt region proceeded across the porous members indicating the extent of migration of the hydroxyl ions from the generating metal-electrolyte interface.

Having thus described my invention, I clam:

1. In a time temperature indicating device wherein a metal member is in contact with a porous matrix containing an acidic electrolyte substance and wherein hydroxyl ions are generated in the electrolyte at the electrolyte-metal interface and migrate along said porous matrix at a rate proportional to the temperature the improvement which comprises an electrolyte substance, including an oxidizing agent and a reducing agent as an indicator of the extent of migration of said hydroxyl ions, impregnating said porous matrix; the oxidizing and reducing agents being characterized in that they are capable of undergoing an irreversible oxidation-reduction reaction under the influence of increasing pH to produce a marked color change.

2. In a time temperature indication device wherein a metal member is in contact with a porous matrix containing an acidic electrolyte substance and wherein hydroxyl ions are generated in the electrolyte at the electrolyte-metal interface and migrate along said porous matrix at a rate proportional to the temperature the improvement which comprises an electrolyte substance, including an oxidizing agent and a reducing agent as an indicator of the extent of migration of said hydroxyl ions, impregnating said porous matrix; the oxidizing agent being the salt of a metal selected from the group consisting of bismuth and mercury, and a reducing agent, said reducing agent characterized in that it is capable of reacting with said metal salts under the influence of increasing pH to produce a marked color change.

3. A device in accordance with claim 2 wherein the metal salt is bismuth chloride and the reducing agent is stannous chloride.

4. A device in accordance with claim 2 wherein the metal salt is mercuric chloride and the reducing agent is sodium hypophosphite.

References Cited by the Examiner

UNITED STATES PATENTS

| | | | |
|---|---|---|---|
| 2,118,144 | 5/38 | Berman et al. | 73—356 |
| 2,892,798 | 6/59 | Dobbs et al. | 252—408 |
| 2,970,264 | 1/61 | Eriksen | 324—68 |
| 3,045,179 | 7/62 | Maier | 324—68 |
| 3,055,759 | 9/62 | Ruby et al. | 73—356 |
| 3,090,234 | 5/63 | Reese | 73—356 |

OTHER REFERENCES

Vogel: "Macro and Semimicro Qualitative Inorganic Analysis," 4th edition, 1954, pages 213, 222 and 321.

JOHN H. MACK, *Primary Examiner.*

MURRAY A. TILLMAN, WINSTON A. DOUGLAS,
*Examiners.*